United States Patent
Ma et al.

(10) Patent No.: US 10,562,175 B2
(45) Date of Patent: Feb. 18, 2020

(54) APPARATUS AND METHOD FOR INSTALLING PINS ON A BASE

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventors: Yongzeng Ma, Beijing (CN); Zhiqiang Wang, Beijing (CN); Wei Zhang, Beijing (CN); Qinghe Shen, Beijing (CN); Jiajia Liu, Beijing (CN); Xing Yue, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 805 days.

(21) Appl. No.: 15/097,518

(22) Filed: Apr. 13, 2016

(65) Prior Publication Data
US 2016/0339550 A1 Nov. 24, 2016

(30) Foreign Application Priority Data
May 18, 2015 (CN) .......................... 2015 1 0253486

(51) Int. Cl.
*B23P 19/00* (2006.01)
*B25H 7/02* (2006.01)
*G02F 1/13* (2006.01)
*G02F 1/1335* (2006.01)

(52) U.S. Cl.
CPC ............. *B25H 7/02* (2013.01); *G02F 1/1303* (2013.01); *G02F 1/133516* (2013.01)

(58) Field of Classification Search
CPC ......... B23P 19/00; B23P 19/04; B23P 19/006; B25H 1/00; B25H 1/02; B25H 7/00; B25H 7/02
See application file for complete search history.

(56) References Cited

U.S. PATENT DOCUMENTS

| | | | | |
|---|---|---|---|---|
| 5,984,293 A * | 11/1999 | Abrahamson | .......... | B23Q 1/035 269/236 |
| 6,032,348 A * | 3/2000 | Haas | .......... | B25B 1/2421 269/266 |
| 6,695,298 B1 * | 2/2004 | Hertz | .......... | B23Q 1/035 269/266 |

(Continued)

*Primary Examiner* — Lee D Wilson
(74) *Attorney, Agent, or Firm* — Armstrong Teasdale LLP

(57) ABSTRACT

An apparatus for installing pins on a base is provided. The apparatus includes an upper positioning plate provided with a plurality of first pin holes through which pins can pass, a lower positioning plate arranged opposite the upper positioning plate and provided with a plurality of second pin holes through which pins can pass, wherein the plurality of second pin holes correspond to pin marks on the base, and a move assembly which is arranged between the upper positioning plate and the lower positioning plate, the move assembly configured to cause the upper positioning plate and the lower positioning plate to move relative to one another, such that at least some of the plurality of first pin holes align with target pin marks on the base.

18 Claims, 3 Drawing Sheets

(56) References Cited

U.S. PATENT DOCUMENTS

| | | | |
|---|---|---|---|
| 7,311,302 B1 * | 12/2007 | Farlow | H05K 13/0069 269/21 |
| 2008/0203644 A1 * | 8/2008 | DaSilva | A61B 17/02 269/309 |
| 2015/0265800 A1 * | 9/2015 | Piellard | B25B 9/02 29/281.4 |
| 2016/0339550 A1 * | 11/2016 | Ma | B25H 7/02 |

* cited by examiner

APPARATUS AND METHOD FOR INSTALLING PINS ON A BASE

CROSS REFERENCE TO RELATED APPLICATION

This application claims the benefit and priority of Chinese Patent Application No. 201510253486.4 filed on May 18, 2015, the entire content of which is incorporated herein by reference.

BACKGROUND

The present invention relates to display technologies, and more particularly, to an apparatus and method for installing pins on a base.

Currently, in a process of manufacturing a color filter (CF) substrate, it is required to vacuum dry the CF substrate to remove solvent in photoresist, after coating the CF substrate. The vacuum drying requires that the CF substrate is in a state similar to suspending. Usually the CF substrate could be supported by pins. The pins are usually mounted on a base of a vacuum drying device, and positions at which the pins contact the CF substrate shall not be in a panel region, otherwise the deformation of the substrate leads to uneven film thickness in the panel region and thus causes pin mura. Since different products have different patterns, the positions at which the pins are placed will change accordingly. During the vacuum drying process, it is necessary to manually change the positions of pins for the CF substrates of different products.

The existing approach to change the positions of pins is to mark the positions of pins on the base of the vacuum drying device (for example, using pin marks). The pin marks are different from one product from another. It is required for the different products to move the pins to the corresponding pin marks prior to vacuum drying the CF substrate. Due to a large number of pin marks, poor lighting inside the vacuum drying device, etc., this approach may easily lead to change error of the pins, or the contact position of the pins with the substrate in the panel region but not in dummy region, thereby resulting in defective pin marks and poor product quality.

BRIEF DESCRIPTION

The embodiments described herein provide an apparatus and method for installing pins on a base, which solves the problems of the defective pin marks and poor product quality caused by the change error of the pins in the prior art.

According to one aspect, there is provided an apparatus for installing pins on a base. The apparatus includes an upper positioning plate which is provided with a plurality of first pin holes through which pins can pass, a lower positioning plate which is arranged oppositely to the upper positioning plate and is provided with a plurality of second pin holes through which pins can pass, wherein the plurality of second pin holes correspond to pin marks on the base, and a move assembly which is arranged between the upper positioning plate and the lower positioning plate and is configured to cause the upper positioning plate and the lower positioning plate to move relatively, such that at least a part of the plurality of first pin holes of the upper positioning plate matches target pin marks on the base.

In one embodiment, the move assembly includes at least one wheel arranged on a plane of the upper positioning plate facing the lower positioning plate, and at least one rail arranged on a plane of the lower positioning plate facing the upper positioning plate. The at least one wheel is arranged to move along the at least one rail.

In one embodiment, the upper positioning plate is provided with at least one snap-fit element arranged on a plane facing the lower positioning plate. The lower positioning plate is provided with a plurality of holes arranged on a plane facing the upper positioning plate. The plurality of holes is capable of accommodating the at least one snap-fit element.

In one embodiment, the plurality of holes are arranged along the at least one rail.

In one embodiment, the snap-fit element includes a rod arranged to pass through the upper positioning plate, a stopper attached to the rod, a spring fitted onto the rod, wherein an end of the spring is against the stopper and the other end of the spring is against the upper positioning plate, and a baffle fixed on the plane of the upper position plate facing the lower positioning plate, and arranged to cooperate with the stopper to control the rod.

In one embodiment, the snap-fit element further includes a box fixed onto the plane of the upper positioning plate facing the lower positioning plate. The rod passes through both the upper positioning plate and the box. The baffle is arranged on an inner wall of the box.

In one embodiment, the snap-fit element has unlock state and lock state. In the unlock state, the stopper is blocked by the baffle, and the rod does not enter into the corresponding hole. In the lock state, the stopper is away from the baffle, and the rod enters into the corresponding hole.

In one embodiment, the rod is provided with a cap at the top.

According to another aspect, there is provided a method for installing pins on a base. The method includes arranging the apparatus on the base, such that a plurality of pin holes of a lower positioning plate of the apparatus correspond to pin marks on the base, causing the upper positioning plate and the lower positioning plate to move relatively, such that at least a part of a plurality of pin holes of an upper positioning plate of the apparatus matches target pin marks on the base, and installing pins in the at least a part of the plurality of pin holes of the upper positioning plate.

In one embodiment, the method further includes removing the installed pins, causing the upper positioning plate and the lower positioning plate to move relatively, such that at least another part of the plurality of pin holes of the upper positioning plate matches new target pin marks on the base, and installing pins in the at least another part of the plurality of pin holes of the upper positioning plate.

In one embodiment, the method further includes determining whether the installed pins have the same high and adjusting positions of the higher pins.

BRIEF DESCRIPTION OF THE DRAWINGS

The drawings described herein are for illustrative purposes only of example embodiments, do not include all possible implementations of the disclosure, and are not intended to limit the scope of the present disclosure, wherein.

DETAILED DESCRIPTION

To facilitate better understanding of the embodiments described herein, the technical solution according to the embodiments of the disclosure will be described in detail in conjunction with the drawings. Obviously the following embodiments are merely a part of, rather than all of, the embodiments covered by the disclosure. On the basis of these embodiments, a person skilled in the art may obtain other embodiments, which also fall within the scope of the present disclosure.

Figure 1:
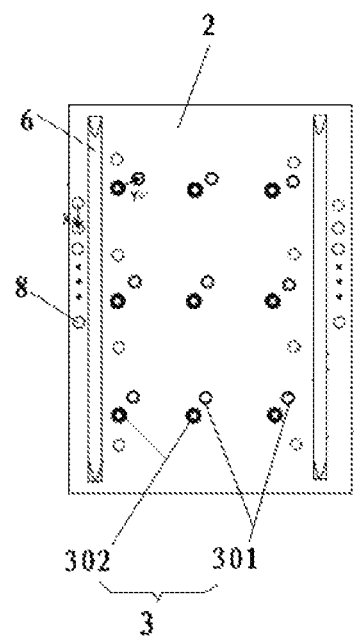
FIG. 1 is a top view of the lower positioning plate of the apparatus for installing pins on a base according to an embodiment.
Figure 2:
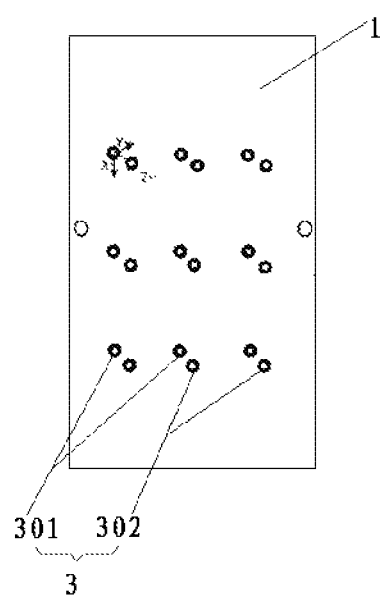
FIG. 2 is a top view of the upper positioning plate of the apparatus for installing pins on a base according to an embodiment.
Figure 3:
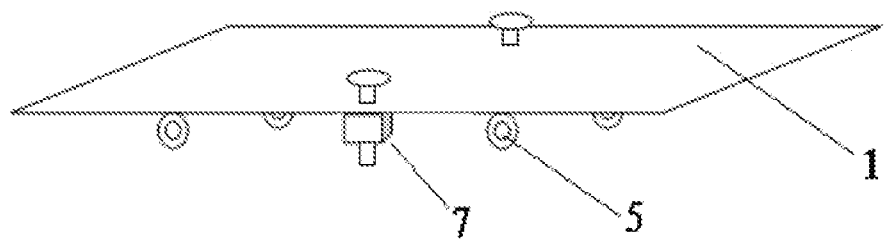
FIG. 3 is a schematic perspective view of the upper positioning plate of the apparatus for installing pins on a base according to an embodiment.

As shown in FIGS. 1, 2, and 3, the apparatus of one embodiment for installing pins on a base may include an upper positioning plate 1 and a lower positioning plate 2 which are arranged oppositely, and a move assembly. The move assembly is arranged between the upper positioning plate 1 and the lower positioning plate 2, and may cause the upper positioning plate 1 and the lower positioning plate 2 to move relatively in the horizontal direction. Both the upper positioning plate 1 and the lower positioning plate 2 are provided with a plurality of pin holes 3, through which the pins can pass. The pin holes 3 of the lower positioning plate 2 may correspond to the pin marks on the base 14. In some embodiments, the base 14 may be a base of a device for vacuum drying a substrate. The pin marks corresponding to pin distributions of various products may be arranged on the base 14. Accordingly the lower positioning plate 2 may be provided with a plurality of pin holes 3 which correspond to all the pin marks on the base 14. In some embodiments, the pin holes 3 of the lower positioning plate 2 may be arranged in groups to represent the pin marks of different products. Each of the groups may be arranged in matrix. In some embodiments, the pin holes 3 of the upper positioning plate 1 may also be arranged in groups and each of the groups may correspond to the pin marks of a certain product. When the upper positioning plate 1 moves to a certain position, one group of the pin holes 3 of the upper positioning plate 1 may match the pin marks of a certain product on the base 14. Similarly when the upper positioning plate 1 moves to another position, another group of the pin holes 3 of the upper positioning plate 1 may match the pin mark of another product on the base 14. By moving the upper positioning plate 1, a certain group of the pin holes 3 of the upper positioning plate 1 may match target pin marks of a target product on the base 14. The upper positioning plate 1 and the lower positioning plate 2 may be made of polyvinyl chloride (PVC). In some embodiments, the lower positioning plate 2 may be in rectangular shape, and may cover all the pin marks on the base 14. The upper positioning plate 1 may also be in rectangular shape and may be larger than the lower positioning plate 2 to completely cover the lower positioning plate 2.

The above-described apparatus may be used to install the pins. Firstly the apparatus may be placed on the base 14 of the device for vacuum drying a substrate. There may be provided with the pin marks on the base 14, including the pin marks for various products. The apparatus may be placed such that the pin holes 3 of the lower positioning plate 2 correspond to the pin marks on the base 14. When it is required to install new pins 4 on the base 14, the pin marks corresponding to the new pins (i.e. the target pin marks) may be determined at first. Then the upper positioning plate 1 may move relative to the lower positioning plate 2 under the control of the move assembly arranged between the upper positioning plate 1 and the lower positioning plate 2, such that the pin holes 3 of the upper positioning plate 1 matching the target pin marks are aligned with the corresponding pin holes 3 of the lower positioning plate 2, and accordingly are aligned with the target pin marks (e.g. the pin marks for a certain product) on the base 14. The new pins 4 then are installed in the pin holes 3 of the upper positioning plate 1 matching the target pin marks. In the process of installment, if it is detected that one or more pins 4 are not as high as other pins 4, e.g., is higher than others, it indicates that the one or more pins 4 are not installed in the pin holes 3 of the upper positioning plate 1 aligned with those of the lower positioning plate 2 correctly. Then the one or more pins 4 could be adjusted. The relative movement of the upper positioning plate 1 and lower positioning plate 2 may control the exposure and shield of the pin marks on the base 14.

With the apparatus for installing pins on a base according to the above embodiments, the pin holes on the lower positioning plate 2 can correspond to the pin marks on the base 14, and some pin holes of the upper positioning plate 1 can match the target pin marks on the base 14 by moving the upper positioning plate 1 relative to the lower positioning plate 2, and accordingly these pin holes of the upper positioning plate 1 are also aligned with the corresponding pin holes of the lower positioning plate 2. Then the pins can be installed in the pin holes of the upper positioning plate 1 matching the target pin marks. Therefore the apparatus according to the embodiments described herein can increase the accuracy of the pin installment and change, reduce the defective pin marks and thus improve the product quality.

As shown in FIGS. 1 and 3, the move assembly may include at least one wheel 5 and at least one rail 6. As an example, FIG. 1 shows two rails 6, and FIG. 3 shows four wheels 5. The wheels 5 may be arranged on a plane of the upper positioning plate 1 facing the lower positioning plate 2. The rails 6 may be arranged on a plane of the lower positioning plate 2 facing the upper positioning plate 1. The wheels 5 on the upper positioning plate 1 may move on the rail 6 so as to cause the upper positioning plate 1 to move relative to the lower positioning plate 2.

In some embodiments, at least one snap-fit element 7 may be arranged on a plane of the upper positioning plate 1 facing the lower positioning plate 2 (as an example, only one snap-fit element 7 is shown in FIG. 3). A plurality of holes 8 may be arranged on a plane of the lower positioning plate 2 facing the upper positioning plate 1, and the holes 8 are capable of accommodating the snap-fit element 7. The holes 8 may be arranged along the rails 6 on the lower positioning plate 2. The number and positions of the holes 8 may be determined as necessary. As shown in FIGS. 1 and 2, for example, the first group of pins PIN1 corresponds to the first group of pin holes 301 of the upper positioning plate 1 and the lower positioning plate 2, and the second group of pins PIN2 corresponds to the second group of pin holes 302 of the upper positioning plate 1 and the lower positioning plate 2. The relative position between the pin marks for the first group of pins PIN1 and the pin marks for the second group of pins PIN2 may be represented by a vector y, and the relative position between the first holes 8 corresponding to the first group of pins PIN1 and the second holes 8 corresponding to the second group of pins PIN2 may be represented by a vector x. After determining the corresponding positions, the relative position between the upper positioning plate 1 and the lower positioning plate 2 may be fixed by snapping the upper positioning plate 1 and the lower positioning plate 2, to prevent installment of the pins 4 from position changes.

As shown in FIGS. 1 and 2, the vector for the relative position between the first group of pins PIN1 and the second group of pins PIN2 is represented by z=x+y. As the upper positioning plate 1 may move between the holes 8 and the groups of the pin marks are different from each other, the pin holes 3 of the upper positioning plate 1 and lower positioning plate 2 may be completely misaligned. After the snap-fit element 7 of the upper positioning plate 1 enters into one of the holes 8 of the lower positioning plate 2, only one group of the pin marks could be selected by both the upper positioning plate 1 and lower positioning plate 2.

Figure 4:
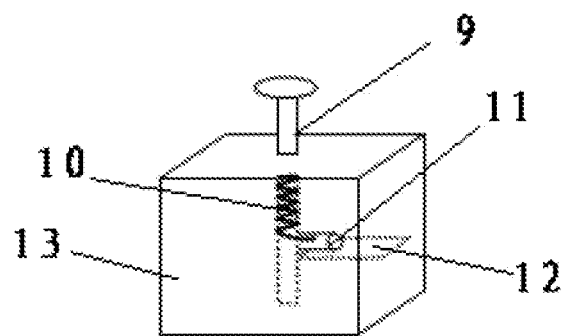
FIG. 4 is a schematic diagram of the structure of the snap-fit element in the apparatus for installing pins on a base according to an embodiment.

As shown in FIGS. 3 and 4, the snap-fit element 7 of the upper positioning plate 1 may include a rod 9, a spring 10, a stopper 11 and a baffle 12. The rod 9 may pass through the upper positioning plate 1, and enter into the holes 8 of the lower positioning plate 2 to fix the upper positioning plate 1 and determine the pin marks. The stopper 11 may be attached to the rod 9. The spring 10 may be fitted onto the rod 9, an end of which is against the stopper 11 and the other end is against the upper positioning plate 1. The baffle 12 may be fixed on the plane of the upper positioning plate 1 facing the lower positioning plate 2 and arranged to cooperate with the stopper 11 to control the movement of the rod 9. In some embodiments, the baffle 12 may be, for example, a metal plate.

The snap-fit element 7 may further include a box 13. The box 13 may be fixed on the plane of the upper positioning plate 1 facing the lower positioning plate 2. The rod 9 may pass through both the upper positioning plate 1 and the box 13, and is movable relative to the box 13. The baffle 12 may be arranged on the inner wall of the box 13. In this case, the box 13 is used to fix the baffle 12.

In some embodiments, the snap-fit element 7 has unlock state and lock state. In the unlock state, the stopper 11 is blocked by the baffle 12, and the rod 9 does not enter into any hole 8. In the lock state, the stopper 11 is away from the baffle 12, and the rod 9 enters into the hole 8.

The process of unlocking the snap-fit element 7 is described as follows. The rod 9 of the snap-fit element 7 may be lifted and rotated to a certain angle such that the stopper 11 attached to the rod 9 may lean on the baffle 12. In this way, the rod 9 of the snap-fit element 7 may be fixed due to the spring 10 and will not enter into the hole 8 of the lower positioning plate 2. At this time, the upper positioning plate 1 and lower positioning plate 2 are separated, and the upper positioning plate 1 may move.

The process of locking the snap-fit element 7 is described as follows. The rod 9 of the snap-fit element 7 may be lifted and rotated so that the stopper 11 attached to the rod 9 can be away from the baffle 12. In this way, the rod 9 may enter into the hole 8 of the lower positioning plate 2 due to the spring 10. At this time, the upper positioning plate 1 and lower positioning plate 2 are fixed, and only one group of pin marks for a certain product is not shielded on the base 14.

It can be seen from the above description that the snap-fit element 7 in the embodiments described herein has a simple structure and easy to use.

Further, in some embodiments, the rod 9 may be provided with a cap at the top, which may facilitate the operation on the rod 9.

Figure 5:
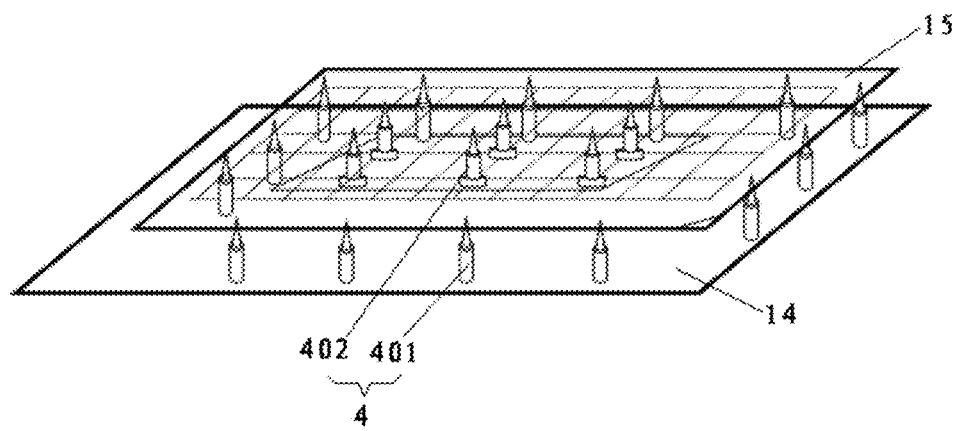
FIG. 5 is a schematic diagram illustrating the vacuum drying for a color filter substrate.

FIG. 5 illustrates the vacuum drying for a color filter substrate 15. As shown in FIG. 5, the color filter substrate 15 is supported by the pins 4 on the base 14. The pins 4 may include fixed pins 401 and movable pins 402.

Figure 6:
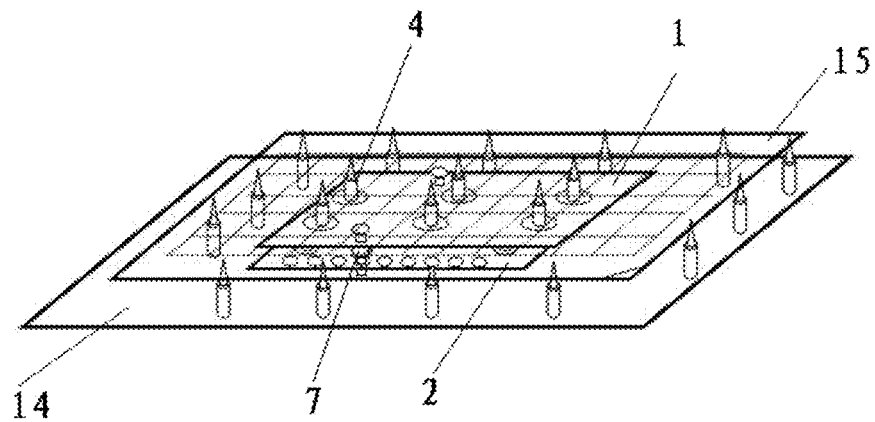
FIG. 6 is a diagram illustrating a scenario in which the apparatus for installing pins on a base according to an embodiment is employed.

FIG. 6 illustrates a scenario in which the apparatus as shown in FIGS. 1-4 is employed. The apparatus may be used for installing the pins and replacing the pins on the base 14.

Firstly the apparatus according to the embodiments described herein may be placed on the base 14, such that the pin holes 3 of the lower positioning plate 2 correspond to the pin marks on the base 14. Then the target pin marks may be determined as necessary, e.g., based on the color filter substrate to be vacuum dried. The target pin marks may correspond to the pins 4 to be installed on the base 14. The upper positioning plate 1 may move under the control of the move assembly, so that at least a part of the pin holes 3 of the upper positioning plate 1 matches the target pin marks. At this time, the pin holes of the upper positioning plate 1 aligned with those of the lower positioning plate 2 match the target pin marks. Then the pins 4 may be installed in those pin holes 3 matching the target pin marks. In the case of replacing the installed pins 4, the installed pins 4 may be removed at first. Then the upper positioning plate 1 and the lower position plate 2 are unlocked. The upper positioning plate 1 may move relatively to the lower positioning plate 2 under the control of the move assembly, such that another part of the pin holes 3 of the upper positioning plate 1 matches new target pin marks. The upper positioning plate 1 and the lower position plate 2 are then locked through the snap-fit element 7 and the re-determined hole 8. In this way, another part of the pin holes 3 of the upper positioning plate 1 aligned with those of the lower positioning plate 2 matches the new target pin marks for the color filter substrate of another product. At last the pins 4 may be installed in the pin holes 3 of the upper positioning plate 1 matching the new target pin marks.

In some embodiments, it is further determined whether the installed pins 4 have the same high. If some installed pin is not as high as others, it indicates that this pin is installed incorrectly. The position of the higher pin may be adjusted, so that the adjusted pin is as high as other installed pins.

In this way, it can be determined whether the installment or replacement of the pins 4 is accurate or not.

As shown in FIG. 6, the upper positioning plate 1 and the lower positioning plate 2 of the apparatus are located between the color filter substrate 15 and the base 14, and the upper positioning plate 1 and the lower positioning plate 2 are snapped by the snap-fit element 7. A plurality of pins 4 pass through the upper positioning plate 1 and lower positioning plate 2, and are installed at the target pin marks on the base 14. The pins 4 have the same high. If it is determined that a certain installed pin 4 is not as high as other pins, the position of the pin 4 is checked and this pin 4 is installed at the correct position.

Figure 7:
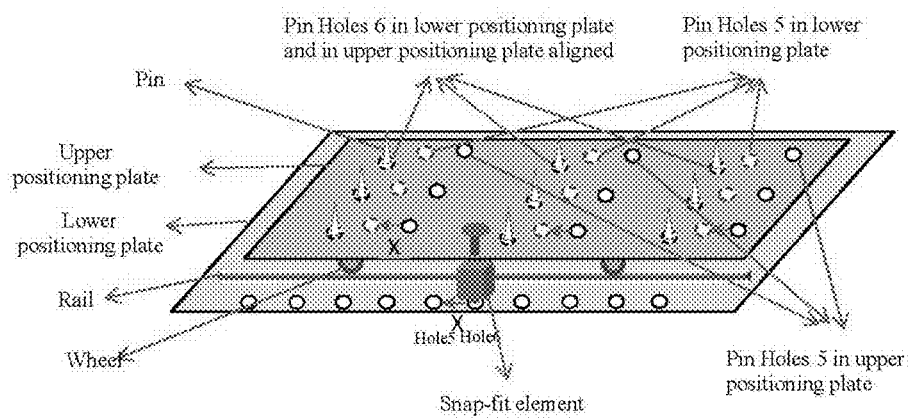
FIG. 7 is an example diagram illustrating the apparatus according to an embodiment.

FIG. 7 shows an example apparatus according to an embodiment. As shown in FIG. 7, the upper positioning plate is couple to the lower positioning plate via the rail and the wheels and the snap-fit element. When the wheels moves on the rail, the upper positioning plate moves relative to the lower positioning plate. The upper positioning plate and the lower positioning plate each comprises two sets of pin holes, Pin Holes 5 and Pin Holes 6. In FIG. 7, when the upper positioning plate moves relative to the lower positioning plate, such that the snap-fit element is engaged with the hole, Hole 6, the set of pin holes Pin Holes 6 in the upper positioning plate is aligned with the set of pin holes Pin Holes 6 in the lower positioning plate. Thus the pins can be installed in the Pin Holes 6. If the snap-fit element is released from Hole 6 and the upper positioning plate continues to move, such that the snap-fit element is engaged with Hole 5, the set of pin holes Pin Holes 6 in the upper positioning plate is not aligned with the set of pin holes Pin Holes 6 in the lower positioning plate, and the set of pin holes Pin Holes 5 in the upper positioning plate is aligned with the set of pin holes Pin Holes 5 in the lower positioning plate. Thus the pins can be installed in the Pin Holes 5.

With the apparatus and method for installing pins on a base according to the embodiments described herein, during the installment or replacement of the pins 4, only one group of the pin marks (target pin marks) can be exposed on the base 14 by the relative movement between the upper position plate 1 and lower position plate 2, and the pins 4 can be installed in the pin holes 3 of the upper positioning plate 1 aligned with those of the lower positioning plate 2 accurately, while other pin marks for other product are shielded. Thus, the accuracy of the installment and replacement of the pins 4 can be increased, and the defective pin marks can be effectively reduced.

The foregoing description of the embodiments has been provided for purpose of illustration and description. Those skilled in the art may make any modification and variation, without departing from the principles of the present disclosure. All such modifications and variations are intended to be included in the scope of the present disclosure.

What is claimed is:

1. An apparatus for facilitating installation of pins on a base, the apparatus comprising:
    an upper positioning plate provided with a plurality of first pin holes through which pins can pass;
    a lower positioning plate provided with a plurality of sets of second pin holes through Which pins can pass, wherein the plurality of sets of second pin holes correspond to a plurality of sets of pin marks on the base; and
    a move assembly coupling the upper positioning plate to the lower positioning plate, a part of which is coupled to a lower surface of the upper positioning plate that faces the lower positioning plate, and the other part of which is coupled to an upper surface of the lower positioning plate that faces the upper positioning plate,
    wherein the upper positioning plate is operable to move relative to the lower positioning plate via the move assembly, such that one of the plurality of sets of first pin holes aligns with corresponding one of the plurality of sets of second pin holes
    wherein the move assembly comprises:
        at least one wheel coupled to the lower surface of the upper positioning plate; and
        at least one rail coupled to the upper surface of the lower positioning plate: and
    wherein the at least one wheel is configured to move on the at least one rail.

2. The apparatus according to claim 1 further comprising:
    at least one snap-fit element coupled to the lower surface of the upper positioning plate; and
    a plurality of holes defined in the upper surface of the lower positioning plate, the plurality of holes configured to engage the at least one snap-fit element.

3. The apparatus according to claim 2 wherein the plurality of holes are arranged along the at least one rail.

4. The apparatus according to claim 2 wherein the snap-fit element comprises:
    a rod configured to extend through the upper positioning plate;
    a stopper attached to the rod;
    a spring fitted onto the rod, wherein a first end of the spring contacts the stopper and a second end of the spring contacts the upper positioning plate; and
    a baffle coupled to the lower surface of the upper positioning plate and configured to engage the stopper control motion of the rod.

5. The apparatus according to claim 4 wherein the snap-fit element further comprises a box coupled to the lower surface of the upper positioning plate; and
    wherein the rod extends through both the upper positioning plate and the box; and
    wherein the baffle is coupled to an inner wall of the box.

6. The apparatus according to claim 4, wherein the snap-fit element has an unlock state and a lock state, wherein in the unlock state, the stopper is blocked by the baffle and the rod is prevented from entering one of the plurality of holes, and wherein in the lock state, the stopper does not engage the baffle and the rod is free to enter one of the plurality of holes.

7. The apparatus according to claim 4 wherein the rod comprises a cap at a top of the rod.

8. A method for installing pins on a base using the apparatus according to claim 1, the method comprising:
    arranging the apparatus on the base such that the plurality of sets of second pin holes of the lower positioning plate align with the plurality of sets of pin marks on the base;
    moving, via the move assembly, the upper positioning plate relative to the lower positioning plate, such that one of the plurality of sets of first pin holes of the upper positioning plate aligns with corresponding one of the plurality of sets of second pin holes; and
    installing pins in the one of the plurality of sets of first pin holes of the upper positioning plate.

9. The method according to claim 8 further comprising:
    removing the installed pins;
    moving, via the move assembly, the upper positioning plate relative to the lower positioning plate, such that a further set of first pin holes of the upper positioning plate aligns with another set of second pin holes; and
    installing pins in the further set of first pin holes of the upper positioning plate.

10. The method according to claim 8, further comprising:
    determining whether all of the installed pins have the same height relative to the base; and
    adjusting positions of any pins that have a greater height than the remaining pins.

11. A system comprising:
    a base provided with a plurality of sets of pin marks; and
    an apparatus comprising:
        an upper positioning plate provided with a plurality of sets of first pin holes through which pins can pass;
        a lower positioning plate provided with a plurality of sets of second pin holes through which pins can pass, wherein the plurality of sets of second pin holes correspond to the plurality of sets of pin marks; and
        a move assembly coupling the upper positioning plate to the lower positioning plate, a part of which is coupled to a lower surface of the upper positioning plate that faces the lower positioning plate, and the other part of which is coupled to an upper surface of the lower positioning plate that faces the upper positioning plate, wherein the upper positioning plate is operable to move relative to the lower positioning plate via the move assembly, such that one of the plurality of sets of first pin holes aligns with corresponding one of the plurality of sets of second pin holes, wherein the move assembly comprises:
- at least one wheel coupled to the lower surface of the upper positioning plate; and
- at least one rail coupled to the upper surface of the lower positioning plate;

wherein the at least one wheel is configured to move on the at least one rail.

12. The system according to claim 11 wherein the apparatus further comprises:
- at least one snap-fit element coupled to the lower surface of the upper positioning plate; and
- a plurality of holes defined in the upper surface of the lower positioning plate, the plurality of holes configured to engage the at least one snap-fit element.

13. The system according to claim 12 wherein the plurality of holes are arranged along the at least one rail.

14. The system according to claim 12 wherein the snap-fit element comprises:
- a rod configured to extend through the upper positioning plate;
- a stopper attached to the rod;
- a spring fitted onto the rod, wherein a first end of the spring contacts the stopper and a second end of the spring contacts the upper positioning plate; and
- a baffle coupled to the lower surface of the upper positioning plate and configured to engage the stopper to control motion of the rod.

15. The system according to claim 14 wherein the snap-fit element further comprises a box coupled to the lower surface of the upper positioning plate; and
wherein the rod extends through both the upper positioning plate and the box; and
wherein the baffle is coupled to an inner wall of the box.

16. The system according to claim 14 wherein the snap-fit element has an unlock state and a lock state, wherein in the unlock state, the stopper is blocked by the baffle and the rod is prevented from entering one of the plurality of holes, and wherein in the lock state, the stopper does not engage the baffle and the rod is free to enter one of the plurality of holes.

17. The system according to claim 16, wherein the rod is selectively rotatable to transition between the unlock and lock state of the snap-fit element.

18. The system according to claim 14 wherein the rod comprises a cap at a top of the rod.

* * * * *